(12) United States Patent
Mondragón Avelar et al.

(10) Patent No.: US 11,674,840 B2
(45) Date of Patent: Jun. 13, 2023

(54) FLUID-LEVEL SENSOR

(71) Applicant: FORD GLOBAL TECHNOLOGIES, LLC, Dearborn, MI (US)

(72) Inventors: José David Mondragón Avelar, Tepotzotlan (MX); Sebastian Rosas Contreras, Xochimilco (MX); Tanya Stephany Soriano Canchola, Tlalnepantla (MX); Miguel Ángel Benítez Torreblanca, Atizapan de Zaragoza (MX); Sheven Sharp, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/479,689

(22) Filed: Sep. 20, 2021

(65) Prior Publication Data

US 2023/0092292 A1    Mar. 23, 2023

(51) Int. Cl.
*G01F 23/36*    (2006.01)
*G01F 23/24*    (2006.01)

(52) U.S. Cl.
CPC ............ *G01F 23/363* (2013.01); *G01F 23/24* (2013.01)

(58) Field of Classification Search
CPC .......................... G01F 23/32–38; G01F 23/24
See application file for complete search history.

(56) References Cited

U.S. PATENT DOCUMENTS

| | | | |
|---|---|---|---|
| 5,743,136 A | 4/1998 | Gaston et al. | |
| 6,127,916 A | 10/2000 | Cooper et al. | |
| 6,176,134 B1* | 1/2001 | Langer | G01F 23/36 |
| | | | 73/317 |
| 6,868,724 B2 | 3/2005 | Brzozowski et al. | |
| 6,886,403 B2* | 5/2005 | LaBarge | G01F 23/363 |
| | | | 73/317 |
| 7,091,819 B1 | 8/2006 | Forgue | |
| 2011/0041600 A1 | 2/2011 | Porras et al. | |

FOREIGN PATENT DOCUMENTS

| | | |
|---|---|---|
| CN | 208968630 U | 6/2019 |
| EP | 3404376 A1 | 11/2018 |
| KR | 101785387 B1 | 10/2017 |

* cited by examiner

*Primary Examiner* — Justin N Olamit
(74) *Attorney, Agent, or Firm* — Vincent Mastrogiacomo; Brooks Kushman P.C.

(57) ABSTRACT

A fluid-level sensor includes a housing, a substrate supported by the housing and defining an arcuate slot completely though a thickness of the substrate, and electrically conductive traces disposed on a backside of the substrate. A wiper assembly is disposed adjacent to a front side of the substrate and includes an arm pivotal relative to the substrate and a wiper attached to the arm. The wiper has an elongate neck extending through the slot and a head attached to the neck and in contact with the traces to close an electric circuit, wherein the wiper is configured to move along the slot and slide across the traces responsive to pivoting of the arm to vary resistance of the electric circuit to output a fluid-level reading.

19 Claims, 4 Drawing Sheets

FLUID-LEVEL SENSOR

TECHNICAL FIELD

The present disclosure relates to fluid-level sensors for gauging an amount of fuel within an automotive fuel tank.

BACKGROUND

Many automobiles include internal-combustion engines that convert liquid fuel, such as gasoline or diesel, into mechanical power via combustion. These vehicles include a fuel tank that stores the liquid fuel. Within the fuel tank is a fluid-level sensor configured to measure the amount of fuel within the tank. The fluid-level sensor may be in communication with a controller that is configured to interpret the sensor reading into a percentage of remaining fuel. A gauge may be provided within an interior of the vehicle and configured to display the percentage of fuel within the fuel tank.

SUMMARY

According to one embodiment, a fluid-level sensor includes a housing, a substrate supported by the housing and defining an arcuate slot completely though a thickness of the substrate, and electrically conductive traces disposed on a backside of the substrate. A wiper assembly is disposed adjacent to a front side of the substrate and includes an arm pivotal relative to the substrate and a wiper attached to the arm. The wiper has an elongate neck extending through the slot and a head attached to the neck and in contact with the traces to close an electric circuit, wherein the wiper is configured to move along the slot and slide across the traces responsive to pivoting of the arm to vary resistance of the electric circuit to output a fluid-level reading.

According to another embodiment, a fluid-level sensor includes a substrate defining an arcuate slot and having electrically conductive traces disposed on a backside of the substrate. A wiper assembly includes an arm pivotal relative to the substrate and an electrical contact attached to the arm. The contact extends through the slot and is disposed against the traces to form an electric circuit having resistance dependent upon a circumferential position of the contact within the slot to output a fluid-level reading.

According to yet another embodiment, a fluid-level sensor includes a housing defining a receptacle and a card disposed in the receptacle and having a front side and a backside. The card defines an arcuate slot extending circumferentially across the card and extending axially from the front side to the backside. Electrically conductive traces are disposed on a backside of the card. A wiper assembly of the sensor includes an arm pivotally attached to the housing and spaced from the front side of the card. A wiper has a base attached to the arm, a neck projecting axially outward from the base at an oblique angle to extend through the slot, and a head attached to the neck and in contact with the traces to close an electric circuit. The neck is elastically deformed away from the arm to create forceful contact between the head and the traces. A float is attached to the arm and is configured to rise and fall with fluid level to pivot the arm relative to the housing, wherein pivoting of the arm changes position of the wiper within the slot.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
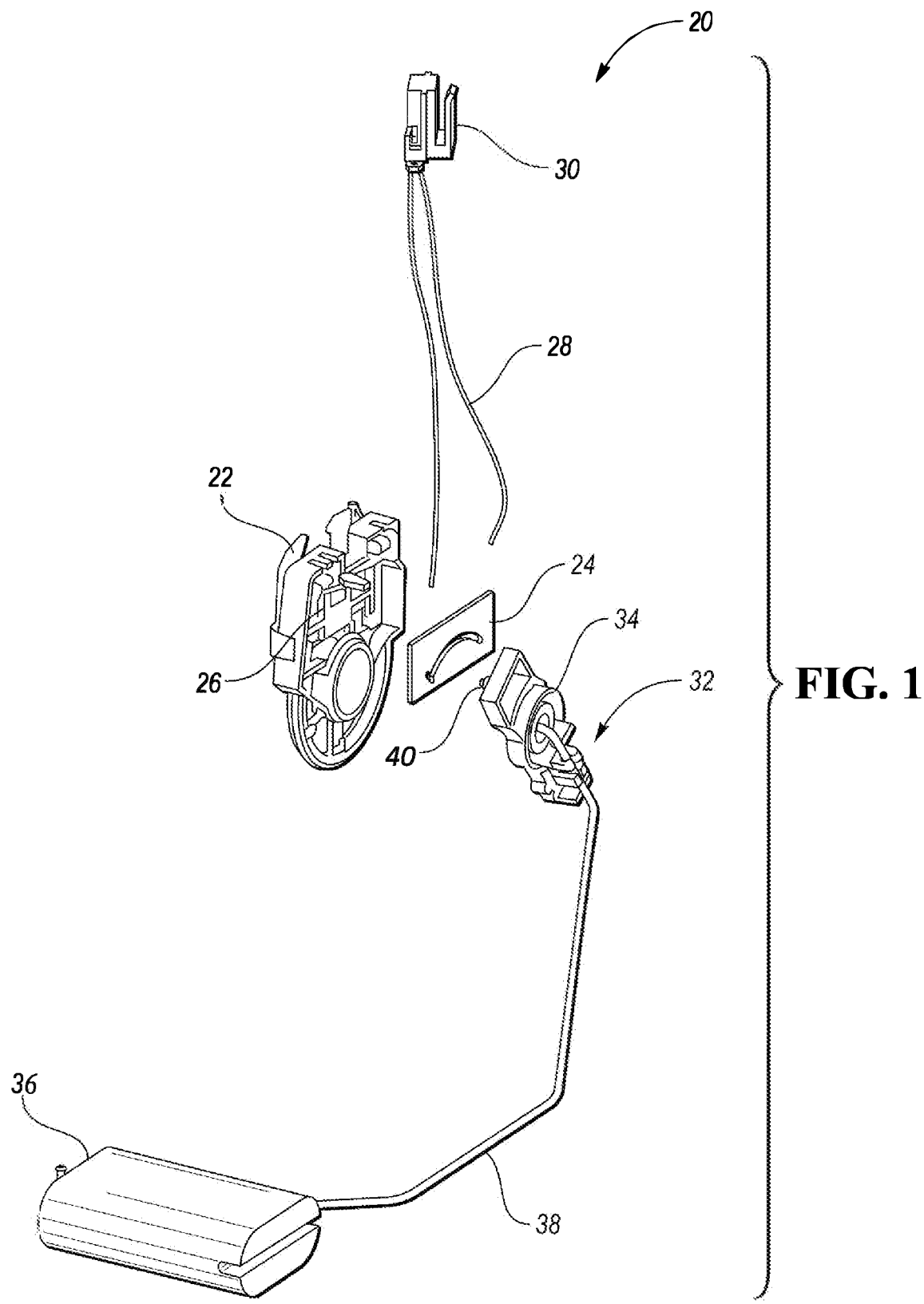
FIG. 1 illustrates an exploded view of a fluid-level sensor.

Referring to FIG. 1, a fluid-level sensor 20 is configured to be disposed within a fuel tank. The sensor 20 includes a housing 22 configured to be fixed within the fuel tank. The housing 22 supports a resistor element that includes a card 24, which may be in the form of a ceramic card or other electrically insulative material. The housing 22 may include features 26 configured to hold the ceramic card 24 stationary. As will be described in more detail below, the ceramic card 24 has electrically conductive traces disposed on, e.g., printed, on a backside of the card. The electrically conductive traces are electrically connected to wires 28 that attach with a sensor connector 30.

A wiper assembly 32 includes an arm 34 pivotally connected to the housing and a wiper 40 supported on the arm 34. The wiper, i.e., an electrical contact, engages with the traces of the ceramic card 24. Rotation of the wiper arm 34 relative to the housing 22 causes the wiper to sweep across the traces, thus changing a resistance of the circuit to produce a readable signal indicative of fuel level. The wiper arm 34 is mechanically connected with a float 36 via a connecting rod 38. The float 36 is buoyant relative to the fuel and moves up and down with the fuel level. The up-and-down movement of the float rotates the arm 34 and thus slides the wiper 40 relative to the traces to output different resistances interpretable was fuel-level readings.

Figure 2A:
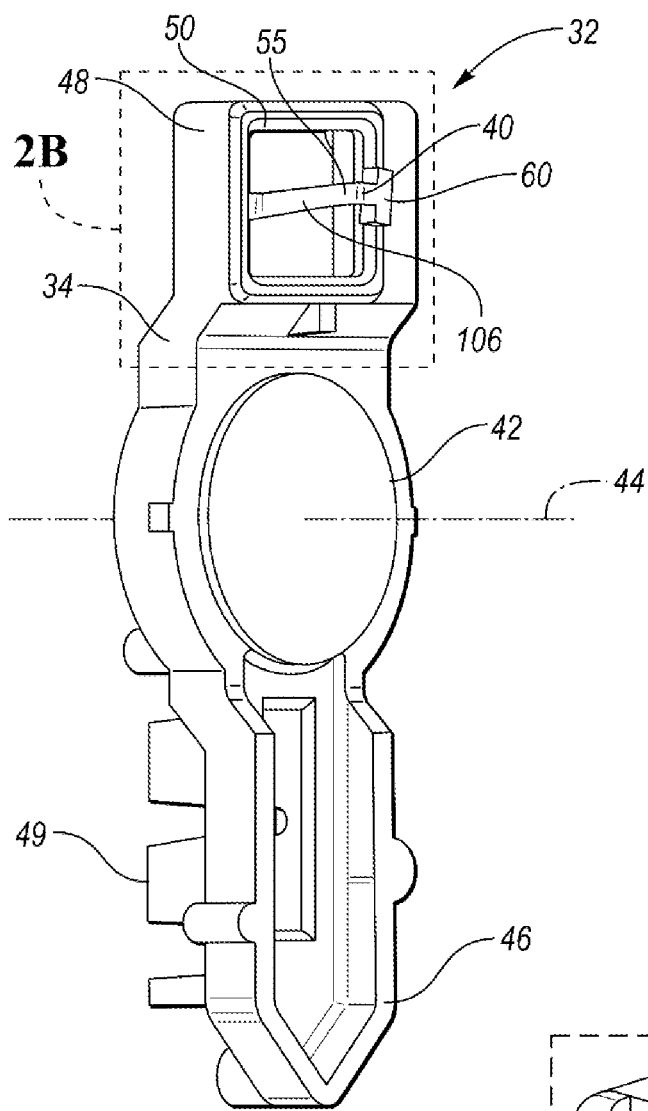
FIG. 2A illustrates a perspective view of a wiper arm and wiper of the fluid-level sensor.
Figure 2B:
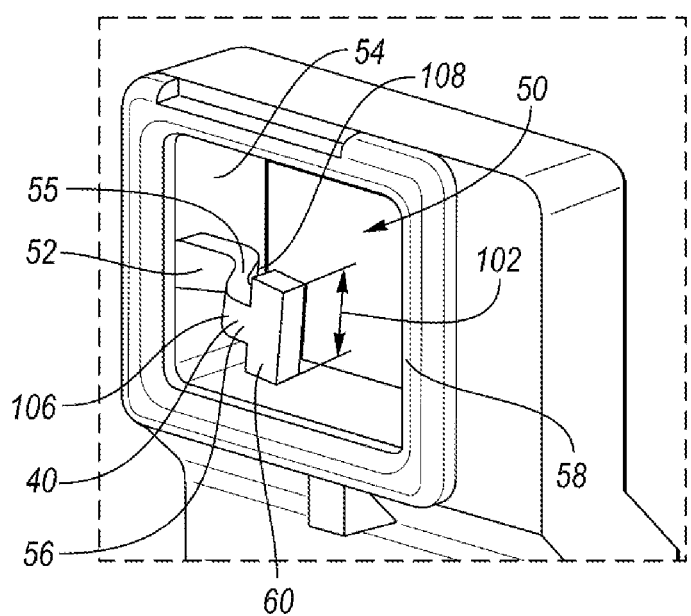
FIG. 2B illustrates a magnified view of FIG. 2A showing the wiper in more detail.

Referring to FIGS. 2A and 2B, the wiper assembly 32 includes the arm 34 and a wiper 40 configured to engage with the ceramic card 24. The arm 34 includes a central portion 42 that is pivotally connected to the housing 22 about a pivot axis 44. A lower portion 46 of the arm includes features 49 for coupling to the rod 38 of the float 36. An upper portion 48 supports the wiper 40. In the illustrated embodiment, the upper portion 48 defines a rectangular window or opening 50. The opening 50 may be through the entire thickness of the wiper arm 34.

The wiper 40 includes a base 52 connected to a sidewall 54 of the window. A neck 55 extends from the base 52 at an oblique angle. The neck 55 may be bent to project outwardly from the sidewall 54 and to project forwardly away from the arm 34 so that the distal end 56 of the neck 55 is raised from an outer-most face 58 of the arm 34. A head 60 is attached to the distal end 56 of the neck 55. The head 60 may be rectangular and oriented with a long side attached to the neck 55 to create a substantially tee-shaped wiper 40. The wiper 40 is formed of an electrically conductive material such as metal. Example metals include cooper, gold, silver, and stainless steel.

Figure 3A:
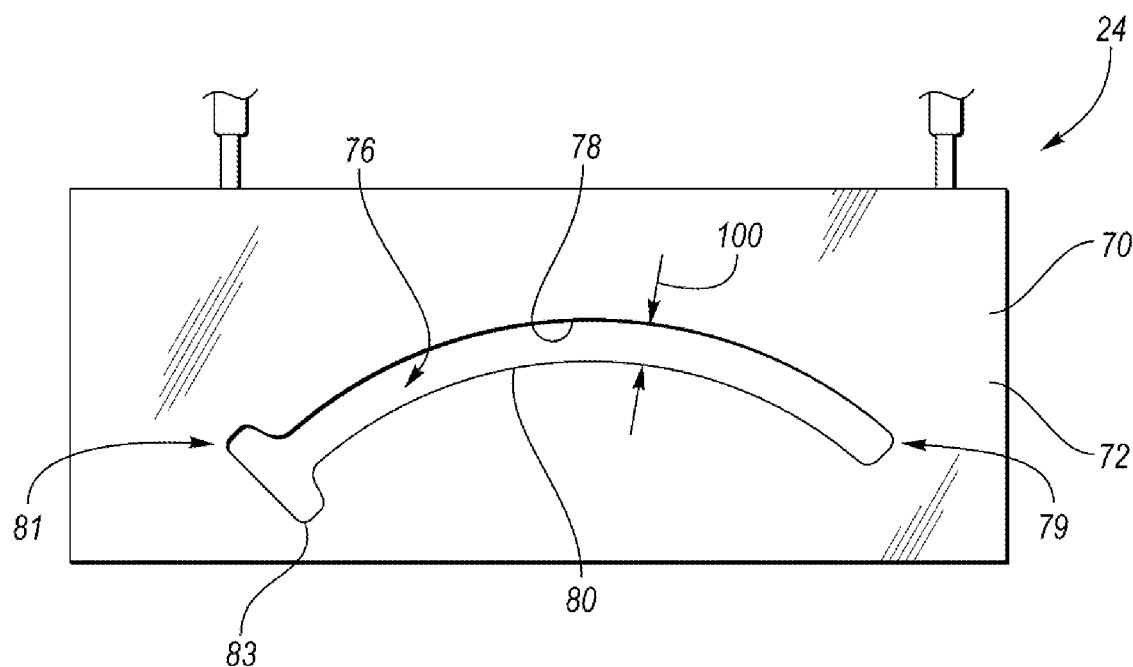
FIG. 3A is a front view of a card of the fluid-level sensor.
Figure 3B:
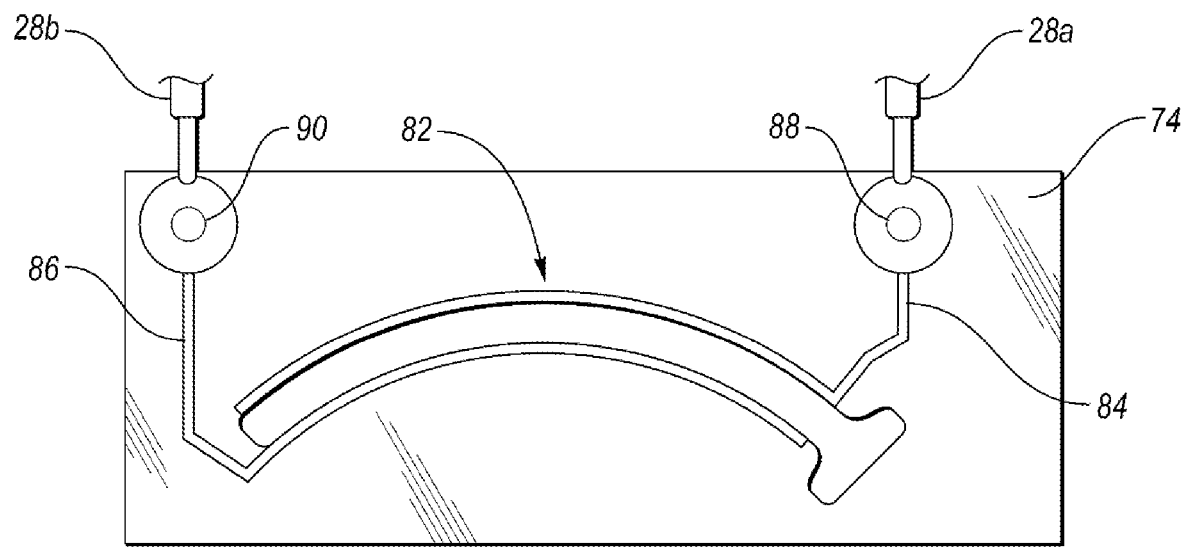
FIG. 3B is a back view of the card showing the conductive traces.

Referring to FIGS. 3A and 3B, the card 24 includes a substrate 70 having a front side 72 and a backside 74. The card 24 is disposed in the housing 22 with the front face 72 facing the wiper assembly 32. The substrate 70 defines an arcuate slot 76 completely though a thickness of the substrate 70. The arcuate slot 76 may be concentric with the central axis 44. The slot 76 includes an upper edge 78 and a lower edge 80 that form peripheries of the slot 76. The slot 76 includes a first end 79 and a second end 81. An enlarged opening 83 is provided at second end 81. The enlarged opening 83 may be a large slot that is oriented to form a tee-shape at the second end 81 of the slot 76. The main slot 76 and the enlarged opening 83 are continuous with each other to form single, continuous void space or opening. The main slot 76 is radially narrower than the enlarged opening 83.

Electrically conductive traces 82 are disposed on the backside 74 of the card 24. The traces 82 may include a first trace 84 that extends along the upper edge 78 and a second trace 86 disposed along the bottom edge 80. The traces do not extend to the enlarged opening as it is merely an insertion hole for assembly and is not utilized during operation of the sensor 20. The trace 84 is connected to the wire 28a such as by solder 88. The trace 86 is connected to the wire 28b such as by solder 90. The traces 82 may be formed of electrically conductive ink that is printed onto the substrate 70.

Figure 4:
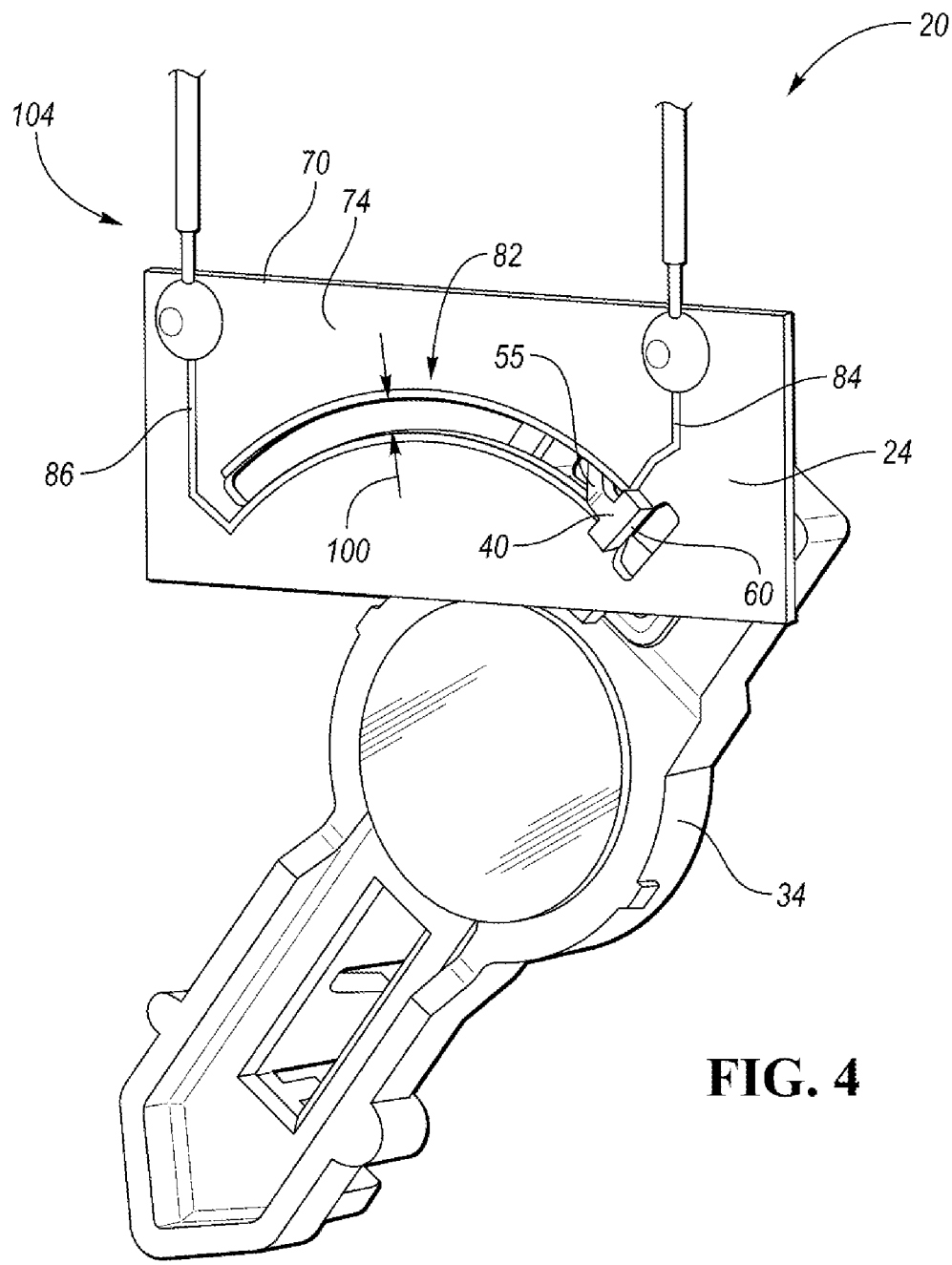
FIG. 4 is a perspective view showing the wiper received through the card.

Referring to FIG. 4, the wiper assembly 32 is positioned adjacent to the front side 72 of the card 24. The wiper 40 is received within the slot 76. During assembly, the wiper 40 may be inserted through the card 24 by aligning the head 60 with the enlarged opening 83 and inserting the head 60 through the opening. The opening 83 is larger than the head 60 but the width 100 of the slot 76 is narrower than the width 102 of the head 60. This prevents the wiper 40 from being pulled through the card and allows the head 60 to contact the traces 84 and 86. That is, the wiper 40 can only be received and removed at the enlarged opening 83. In the assembled state, an intermediary portion of the neck 55 is disposed in the slot and the head 60 is disposed against the traces 82. The wiper 40 closes the electric circuit 104 when contacting both of the traces 84, 86. As the fluid level changes, the wiper 40 travels circumferentially along the length of the slot 76 causing the wiper 40 to sweep across the traces 82 thus changing the electrical resistance of the circuit 104 to provide a signal indicative of changing fuel levels. The travel of the wiper arm 34 is limited so that the wiper 40 remains within the slot 76 and is not permitted to re-enter the enlarged opening 83 during operation of the sensor 20.

The wiper 40 is pre-tensioned and elastically deformed to bias the head 60 against the traces 82. That is, the wiper is bent away from the arm 34 during assembly and naturally seek to spring back towards the arm 34, which is the natural resting position. This ensures good electrical contact between the head 60 and the traces 82 to provide a more reliable operation of the sensor. The pretensioned is created by flexing the head 60 away from the arm 34 causing the neck 55 to elastically bend. This places the neck 55 in an elastically deformed state and creates forceful contact between the head 60 and the backside 74 of the card. More specifically, the neck 55 incudes a first side 108 facing the arm 34 and a second side 106 facing the card 24 (see FIG. 2B). The pre-tension puts the first side 108 in tension and the second side 106 in compression. Said another way, the natural resting position of the head 60 is closer to the arm 34 than the working position of the head 60 when installed through the card 24.

Inserting the wiper 40 through the card to have the head 60 urged against the traces 82 on the backside of the card is more robust than the opposite arrangement in which the traces are on the front side of the card and the head is pre-compressed. For example, in pre-compressed designs, insufficient contact can result if the wiper were to be plastically deformed toward the arm, e.g., crushed. In the design of this disclosure, wiper 40 is hooked into the slot so any inadvertent crushing of the wiper will not affect operation of the sensor 20.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fluid-level sensor comprising:
    a housing;
    a ceramic card supported by the housing and defining an arcuate slot completely through a thickness of the card, the card including a front side and a backside;
    electrically conductive traces disposed on the backside of the card; and
    a wiper assembly disposed adjacent to the front side of the card and including an arm pivotal relative to the card and a wiper attached to the arm, the wiper including an elongate neck extending from the front side, completely through the slot, and to the backside, the wiper further including a head attached to the neck and in contact with the traces to close an electric circuit, wherein the wiper is configured to move along the slot on the backside of the card and slide across the traces responsive to pivoting of the arm to vary resistance of the electric circuit to output a fluid-level reading, wherein the arm is located on the front side of the card and the head is located on the backside of the card.

2. The fluid-level sensor of claim 1 further comprising a float attached to the arm and configured to rise and fall with fluid level to pivot the arm.

3. The fluid-level sensor of claim 1 wherein the traces extend along at least a portion of a periphery of the slot.

4. The fluid-level sensor of claim 1, wherein the slot has an enlarged opening at one end configured to receive the wiper therethrough and a main portion that is narrower than the opening.

5. The fluid-level sensor of claim 4, wherein the head has a width that is wider than the main portion to inhibit removal of the wiper from the slot and is narrower than the opening such that the head is capable of insertion and removal only at the opening.

6. The fluid-level sensor of claim 1, wherein the wiper is tee-shaped.

7. The fluid-level sensor of claim 6, wherein the head is wider than the slot and the neck is narrower than the slot.

8. The fluid-level sensor of claim 1, wherein the wiper is pre-tensioned away from the arm such that the head is urged into contact with the traces.

9. The fluid-level sensor of claim 8, where the neck incudes a first side facing the arm and a second side facing the substrate, wherein the pre-tension puts the first side in tension and the second side in compression.

10. The fluid-level sensor of claim 1, wherein the neck extends away from the arm at an oblique angle.

11. A fluid-level sensor comprising:
a housing;
a substrate supported by the housing and defining an arcuate slot completely though a thickness of the substrate;
electrically conductive traces disposed on a backside of the substrate, wherein the traces include a first trace extending along one side of the slot and a second trace extending along another side of the slot; and
a wiper assembly disposed adjacent to a front side of the substrate and including an arm pivotal relative to the substrate and a wiper attached to the arm, the wiper including an elongate neck extending through the slot and a head attached to the neck and in contact with the traces to close an electric circuit, wherein the wiper is configured to move along the slot and slide across the traces responsive to pivoting of the arm to vary resistance of the electric circuit to output a fluid-level reading.

12. The fluid-level sensor of claim 11 further comprising a float attached to the arm and configured to rise and fall with fluid level to pivot the arm.

13. The fluid-level sensor of claim 11, wherein the wiper is pre-tensioned away from the arm such that the head is urged into contact with the traces.

14. A fluid-level sensor comprising:
a substrate defining an arcuate slot and having electrically conductive traces disposed on a backside of the substrate, wherein the traces include a first trace extending along one side of the slot and a second trace extending along another side of the slot; and
a wiper assembly including an arm pivotal relative to the substrate and located on a front side of the substrate, and the wiper assembly further including an electrical contact attached to the arm, the contact extending completely through the slot and disposed against the traces to form an electric circuit having resistance dependent upon a circumferential position of the contact within the slot to output a fluid-level reading.

15. The fluid-level sensor of claim 14, wherein the slot extends through a thickness of the substrate.

16. The fluid-level sensor of claim 15, wherein the contact includes a neck disposed in the slot with a first portion on the front side and a second portion on the backside and a head connected to the second portion and in contact with the traces.

17. The fluid-level sensor of claim 14, wherein the slot has an enlarged opening at one end configured to receive the contact therethrough and a main portion that is narrower than the opening.

18. The fluid-level sensor of claim 17, wherein the contact is tee-shaped with a head being wider than the main portion and narrower than the enlarged opening.

19. The fluid-level sensor of claim 14, wherein the contact is elastically deformed such that the contact is urged against the traces.

\* \* \* \* \*